US005972513A

United States Patent [19]
Yoshizawa

[11] Patent Number: 5,972,513

[45] Date of Patent: Oct. 26, 1999

[54] LAMINATED GLASS

[75] Inventor: Hideo Yoshizawa, Osaka, Japan

[73] Assignee: Nippon Sheet Glass Co., Ltd., Osaka, Japan

[21] Appl. No.: 09/104,535

[22] Filed: Jun. 25, 1998

[30] Foreign Application Priority Data

Jun. 27, 1997 [JP] Japan .................................... 9-171841

[51] Int. Cl.[6] ...................................................... B32B 17/00

[52] U.S. Cl. .......................... 428/410; 428/212; 428/213; 428/220; 428/426; 428/428; 496/84.1

[58] Field of Search .............................. 428/98, 192, 212, 428/213, 220, 410, 426, 437, 428; 420/437; 296/84.1, 89

[56] References Cited

U.S. PATENT DOCUMENTS 4,075,381 2/1978 Furukawa et al. ...................... 428/192
5,198,304 3/1993 Krämling et al. ...................... 428/437
5,380,575 1/1995 Kaster ...................................... 428/98

FOREIGN PATENT DOCUMENTS 6-29148 B1 4/1994 Japan .
WO 94/17997 8/1994 WIPO .

*Primary Examiner*—Timothy Speer
*Attorney, Agent, or Firm*—Merchant & Gould P.C.

[57] ABSTRACT

The present invention provides a laminated glass. Each single glass sheet has a thickness of 1.5 to 3.2 mm and is subjected to a bending process. At least one of the glass sheets is a semi-tempered glass sheet, which is also called a heat-strengthened glass sheet. The heat-strengthened glass sheet has a plane residual stress distribution where the plane residual stress is a compressive stress at an edge of a peripheral portion of the glass sheet. The plane residual stress changes monotonically from the compressive stress at the edge of the peripheral portion to a tensile stress in a central portion of the glass sheet substantially throughout the peripheral portion of the single glass sheet.

12 Claims, 9 Drawing Sheets

LAMINATED GLASS

FIELD OF THE INVENTION

The present invention relates to a laminated glass suitable for a window glass sheet of automobiles, railroad cars or the like. In particular, the present invention relates to a laminated glass that can be used in a movable part, and a laminated glass including thin glass sheets for lightening.

BACKGROUND OF THE INVENTION

A sheet glass, what is called "safety sheet glass", is used for a window glass of an automobile and the like. "Safety sheet glass" generally refers to two types of glass, i.e., a tempered glass (air-cooling tempered glass) and a laminated glass. In addition, these types of sheet glass usually are subjected to a bending process due to design necessities.

A laminated glass is commonly used for a windshield of an automobile. The Japanese Law as well as many other countries stipulates that a laminated glass should be used in a passenger car. The window glass for a windshield is generally attached to the body frame with an adhesive or a gasket.

Use of the laminated glass as a side window glass of an automobile has been suggested to improve its security against break-in and its soundproofing properties.

The laminated glass is composed of a plurality of single glass sheets, generally having a thickness of about 1.5 to 3.2 mm, that have been annealed, so that it is relatively thin. Therefore, the glass sheet may be broken by an impact to the edge of the glass sheet during handling in the production of the laminated glass or the assembly of it into an automobile or the like.

For a side window glass or a rear window glass of automobiles, a tempered glass is widely used. Although the side window glass is fixed to the body frame in some cases, it is mostly used in the form of a slide mechanism that allows a vertical movement, a hinged revolving mechanism, or a double-sliding mechanism using a rail, for the purpose of opening the window. In some types of automobiles, a glass sheet that moves up and down by a slide mechanism or a glass sheet hatch using a hinge is used for the rear window glass as well.

In particular, for the side window glass for a hinged door, the door may be opened and closed with the window glass partly open. In this case, the window glass is not entirely supported by the window frame, so that the window glass is susceptible to impacts at the time of opening and, especially, closing the door. The front door glass is particularly susceptible to impacts, because it is large and the front door is more frequently opened and closed. The front door glass in a hard-top car with no window frame is even more susceptible to impacts.

The above-mentioned (air-cooled) tempered glass poses no problem concerning its strength. However, when a laminated glass is to be used for a side window glass or the like, strength is a factor that has to be considered.

On the other hand, light weight has been increasingly demanded for parts in view of the fuel efficiency of automobiles. Single thin glass sheets are attached to each other to form a laminated glass for use as a windshield. In this case, as described above, although the glass sheet adheres to the body frame, again, strength is a factor that has to be considered.

It is possible to first obtain single glass sheets that are completely tempered and then to form a laminated glass using them (so-called "tempered-and-laminated glass"). In this case, the problem concerning strength is eliminated. However, if by any chance a tempered-and-laminated glass suffers stress of such magnitude that it cannot withstand, the tempered-and-laminated glass that has broken entirely to be divided into small pieces causes the problem that the visibility for the passengers is lost. Furthermore, when a glass sheet is thin, it may be impossible to temper it enough.

Therefore, in order to overcome the problem of losing visibility and to form a laminated glass with no problem concerning strength, it has been proposed to use semi-tempered single glass sheets. In this case, the problem concerning strength is not eliminated perfectly, although the problem of losing visibility when the sheet is fractured can be eliminated.

In this specification, so-called "semi-tempered glass sheets" are referred to as heat-strengthened glass sheets. A heat-strengthened glass sheet is a glass sheet obtained by subjecting a glass sheet to a heat treatment to form a compressive stress layer of a suitable size in the surface of the glass sheet, so that the breaking strength increases, and that the way it breaks is similar to that of the non-tempered glass sheet. See Japanese Industrial Standard (JIS) R 3222-1990 for details, the disclosure of which is hereby incorporated by reference. However, the invention is not limited to the thickness of the glass sheet exemplified in JIS R 3222-1990.

Now, regarding the above-mentioned laminated glass or a curved sheet glass, a variety of glass sheets have been proposed and produced. For example, a technique disclosed in Japanese Laid-Open Patent Publication (Published Japanese translations of PCT international publication for patent application; "Tokuhyo-Hei") No. 8-506564 will be described below.

"An apparatus and a method for controlling stress in a laminated glass for automobiles" of Japanese Laid-Open Patent Publication (Tokuhyo-Hei) No. 8-506564 disclosed a glass sheet "having an edge compression with the maximum at an edge of a glass sheet and decreasing from the edge toward an inner portion of the glass sheet, and having a net tension value and the maximum tension value at the inner peripheral portion (of the glass sheet)". Furthermore, in the glass sheet, "the maximum of the edge compression is larger than 300 $kg/cm^2$" and "the tension value is smaller than 60 $kg/cm^2$".

The method for producing such a glass sheet includes the steps of "supporting a glass sheet on an annealing ring, cooling the glass sheet on the annealing ring so as to generate a permanent stress on the glass sheet, and insulating a peripheral portion of the glass sheet during cooling so as to maintain a temperature of the peripheral portion at a higher temperature than a strain point when the stress becomes permanent in the glass sheet" (see FIG. 7 in this specification).

According to FIG. 4 of this publication (FIG. 8 of this specification), in the distribution of the stress of the glass sheet according to the invention of Tokuhyo-Hei No. 8-506564, the compressive stress changes into tensile stress when moving away from the edge of the glass sheet toward an inner portion, and the tensile stress has a peak around 30 mm to 40 mm away from the edge. Thereafter, the stress becomes zero.

In other words, Japanese Laid-Open Patent Publication (Tokuhyo-Hei) No. 8-506564 shows the stress distribution of single glass sheets constituting a laminated glass in which the plane residual tensile stress has a peak.

Furthermore, as a result, according to the above-mentioned stress distribution of single glass sheets constituting a laminated glass, an annular plane residual tensile stress region is present in an inner portion along the peripheral portion of the glass sheet. The method for producing the glass sheet is a method utilizing a cooling method using an annealing ring.

Japanese Laid-Open Patent Publication (Tokkai-Hei) No. 4-231361 discloses "a window glass for automobiles" (see FIG. 9 of this specification). The window glass for automobiles disclosed in this publication is "produced from a complex glass sheet 201 formed of two thermally tempered single glass sheets 202 and 203 that are interconnected using a thermoplastic intermediate layer 204, particularly intended for a side window glass that is adjustable vertically, each of the two glass sheets having a thickness of 2.0 to 3.0 mm", "wherein a tensile stress at the center is between 54 and 76 $MN/m^2$ in an edge region 205 of the glass sheet when the thickness of the single glass sheet is 2.0 mm, . . . a tensile stress at the center is between 38 and 60 $MN/m^2$ in a central region 206 of the glass sheet when the thickness of the single glass sheet is 2 mm".

Japanese Laid-Open Patent Publication (Tokkai-Hei) No. 4-231361 refers to the tensile stress at the center of the glass sheet (i.e., the residual stress of the central layer of the glass sheet) as described above, but it does not directly refer to a plane residual stress.

However, the tensile stress at the center of the glass sheet is described, and there are explanations that "an edge region that is tempered more strongly", "because the strength of the edge region increases" or "the tempering of the edge region of the window glass is greater" or the like. These explanations result in the inference about the plane residual stress distribution of the glass sheet according to Japanese Patent Application Publication (Tokkai-Hei) No. 4-231361 that the stress in "the edge region" and the stress in "a visible region" are different.

Furthermore, there is the teaching that "in order to generate a higher and desired tensile stress in the edge region, it is necessary to ensure a larger release of heat in the edge region of the single glass sheet".

In other words, it is inferred that in a cooling method for obtaining the single glass sheet disclosed in Tokkai-Hei No. 4-231361, the cooling condition is not uniform in the area including the peripheral portion and the central portion of the glass sheet.

As a result, in the stress distribution of the single glass sheets constituting the laminated glass, an annular plane residual tensile stress region called "the edge region" in an inner portion along the peripheral portion of the glass sheet is present.

Japanese Patent Publication (Tokko-Sho) No. 63-17777 disclosed the following technique as "a method for producing a laminated glass", specifically a method for producing a curved and laminated glass. The method includes the steps of "laying two glass sheets each having a thickness of 1.5 mm to 3.2 mm on top of each other on a bending member so as to shape accordingly", "cooling the glass sheets at an annealing temperature between 450° C. to 550° C. at a cooling rate of 90° C./min. to 150/min, so as to generate a plane compressive stress of 250 $kg/cm^2$ to 500 $kg/cm^2$ in a region not more than 1.5 cm apart from the edge of the glass sheets". A laminated glass is constituted by the thus produced glass sheets.

Japanese Patent Publication (Tokko-Hei) No. 6-29148 discloses "a method for thermally treating a glass sheet" comprising the steps of supporting "an edge peripheral portion of a glass sheet to be heated by a receiving ring frame" to be subjected to annealing, so as to generate a plane compressive stress of 50 $kg/cm^2$ to 500 $kg/cm^2$ in the edge peripheral portion of the glass sheet.

SUMMARY OF THE INVENTION

The object of the present invention is to provide a laminated glass including curved heat-strengthened single glass sheets and having an excellent strength against impacts inflicted during handling and use.

The object of the present invention has been achieved as a result of noting the following phenomena.

In the above-mentioned techniques in the prior art, a ring member or the like for supporting the peripheral portion of a glass sheet is used when the curved glass sheet is cooled. For this reason, the peak of the tensile stress is generally more or less in the vicinity of the edge of the glass sheet.

In the case where a laminated glass constituted by such glass sheets is used for a side door glass or the like, the laminated glass may be broken by a large force such as the impact caused by the door being closed. This breakage is caused from the point in the vicinity of the edge of the single glass sheets constituting the laminated glass that comprises the peak of the tensile stress.

Regarding these facts, it was decided to attempt to eliminate the peak of the tensile stress in the portion in the vicinity of the edge of the single glass sheet. In order words, it was attempted to cool the glass sheets as uniformly as possible without using a ring member or the like.

In such a manner of cooling the glass sheet, a stress distribution where a plane residual stress changes monotonically from a compressive stress to a tensile stress from the edge of the peripheral portion of the glass sheet toward the central portion of the glass sheet can be obtained.

Furthermore, such a glass sheet can have no annular tensile stress region at an inner portion along the edge of the peripheral portion of the glass sheet.

The present invention is directed to a laminated glass (see FIG. 1) comprising single glass sheets having such a plane residual stress distribution. More specifically, the present invention has the following aspects.

The present invention is directed to a laminated glass comprising at least two single glass sheets and an intermediate layer between the glass sheets so as to adhere the glass sheets. Each single glass sheet has a thickness of 1.5 to 3.2 mm and is subjected to a bending process. At least one of the single glass sheets is a heat-strengthened glass sheet having a plane residual stress distribution where the plane residual stress is a compressive stress at the edge of the peripheral portion of the single glass sheet. The plane residual stress of the sheet changes monotonically from the compressive stress at the edge of the peripheral portion to a tensile stress in a central portion of the glass sheet substantially throughout the peripheral portion of the glass sheet.

The present invention is also directed to a laminated glass comprising at least two single glass sheets and an intermediate layer between the glass sheets so as to adhere the glass sheets. Each single glass sheet has a thickness of 1.5 to 3.2 mm and is subjected to a bending process. At least one of the single glass sheets is a heat-strengthened glass sheet having a plane residual stress distribution where the plane residual stress is a compressive stress at the edge of the peripheral portion of the single glass sheet. No annular plane tensile stress region throughout an entire inner portion along the edge of the peripheral portion of the glass sheet is present.

According to the present invention, a laminated glass includes a single sheet glass having the plane residual stress distribution as defined above. In the single glass sheet, a belt region where a plane stress is tensile is not revealed along the peripheral portion. As a result, there is no peak of the tensile stress that is likely to be the starting point of breaking when an impact is inflicted to the glass sheet.

Therefore, in the case where the laminated glass of the present invention is used, for example, for a door glass sheet for an automobile, it is not likely that the glass sheet is broken by impacts, for example when opening or closing the door. Furthermore, when the windshield laminated glass includes thin single glass sheets for the purpose of light weight, the present invention provides the same effect to ensure the strength during handling or use.

DETAILED DESCRIPTION OF THE INVENTION

Figure 2:
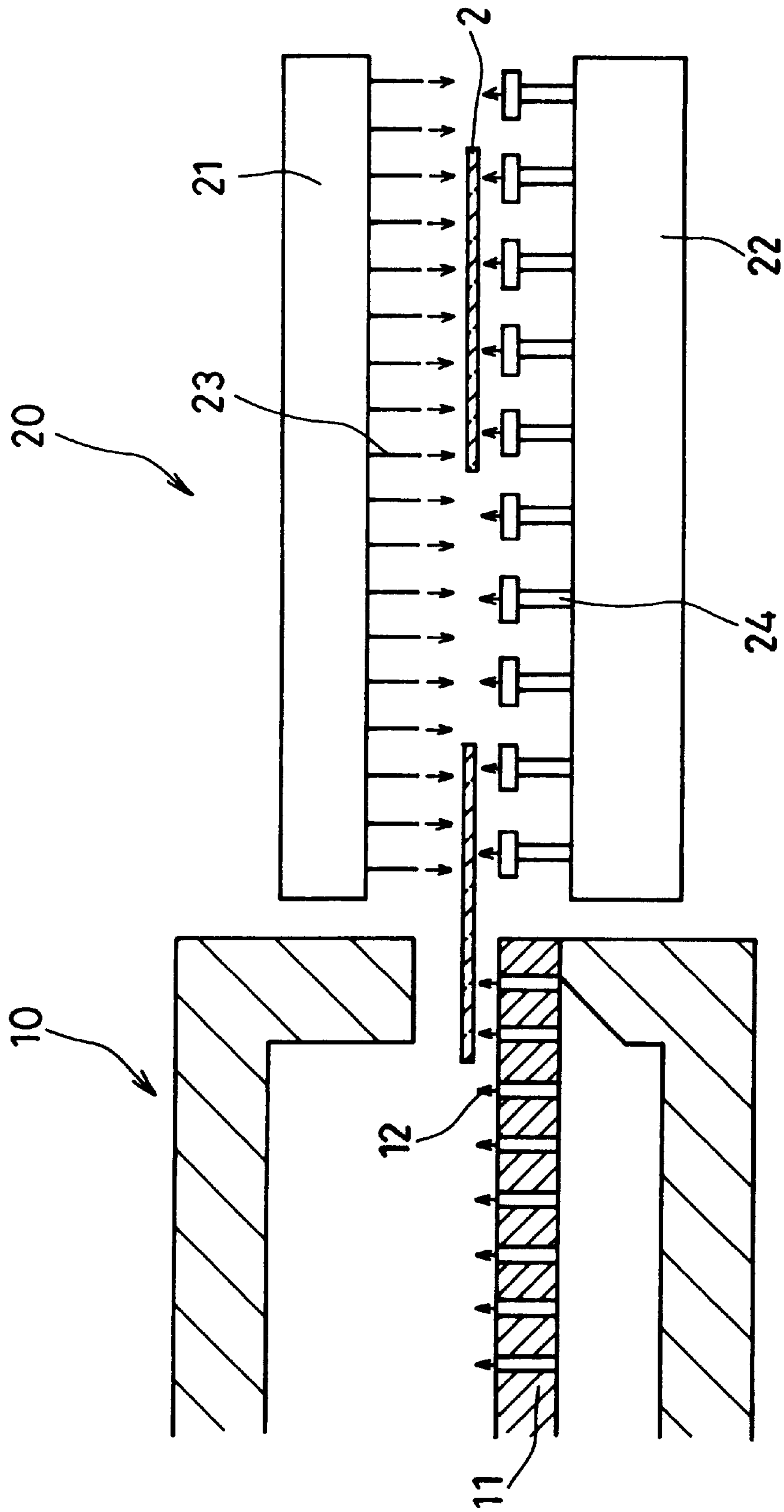
FIG. 2 is a cross-sectional view of an apparatus for producing a single glass sheet for a laminated glass of the invention.

The single glass sheet constituting the laminated glass of the present invention can be produced by the following method (see FIG. 2).

A predetermined curvature is provided for glass sheet conveying means such as conveying rollers and a bed in a furnace in which a glass sheet is heated. The glass sheet that has been heated to a temperature at which its shape is changeable gradually hangs down by its self-weight, and a curved face having the predetermined curvature is eventually formed. Then, the curved glass sheet is cooled in a cooling apparatus adjacent to the heating furnace while being supported by air pressure (see FIG. 3) or a multitude of rollers (see FIG. 4). In other words, the glass sheet is subjected to a heat treatment without being supported in the specific portion (e.g. peripheral portion) of the glass sheet by a ring member or the like.

At this time, the single glass sheet is cooled not to become tempered, but to become semi-tempered, that is, to become a heat-strengthened glass sheet.

The plane compressive residual stress in the glass sheet is preferably 15 MN/$m^2$ or more. The upper limit of the plane compressive residual stress can be any value, as long as it can be introduced into the glass sheet and is within the range in which the characteristics (strength, crushing number) needed for a heat-strengthened glass sheet are satisfied. It can vary depending on the thickness of the single glass sheet and the cooling conditions.

Furthermore, the residual tensile stress in the center layer in the glass sheet is preferably 7 MN/$m^2$ or more. The upper limit of the tensile stress can be any value, as long as it can be introduced into the glass sheet and is within the range in which the characteristics (strength, crushing number) needed for a heat-strengthened glass sheet are satisfied. It can vary depending on the thickness of the used single glass sheet and the cooling conditions.

In all of the above-described conventional examples, the curved glass sheet used a ring member or the like for supporting the peripheral portion of the glass sheet in a cooling process. Therefore, the portion in the vicinity of the peripheral portion of the glass sheet that is in contact with the ring frame or the like is cooled more quickly. Lack of uniformity in cooling causes an annular plane residual tensile stress, as the invention shown in Japanese Laid-Open Patent Publication (Tokuhyo-Hei) No. 8-506564 or the other conventional examples. The plane residual tensile stress usually has its peak at a portion along the edge of the glass sheet.

Figure 3:
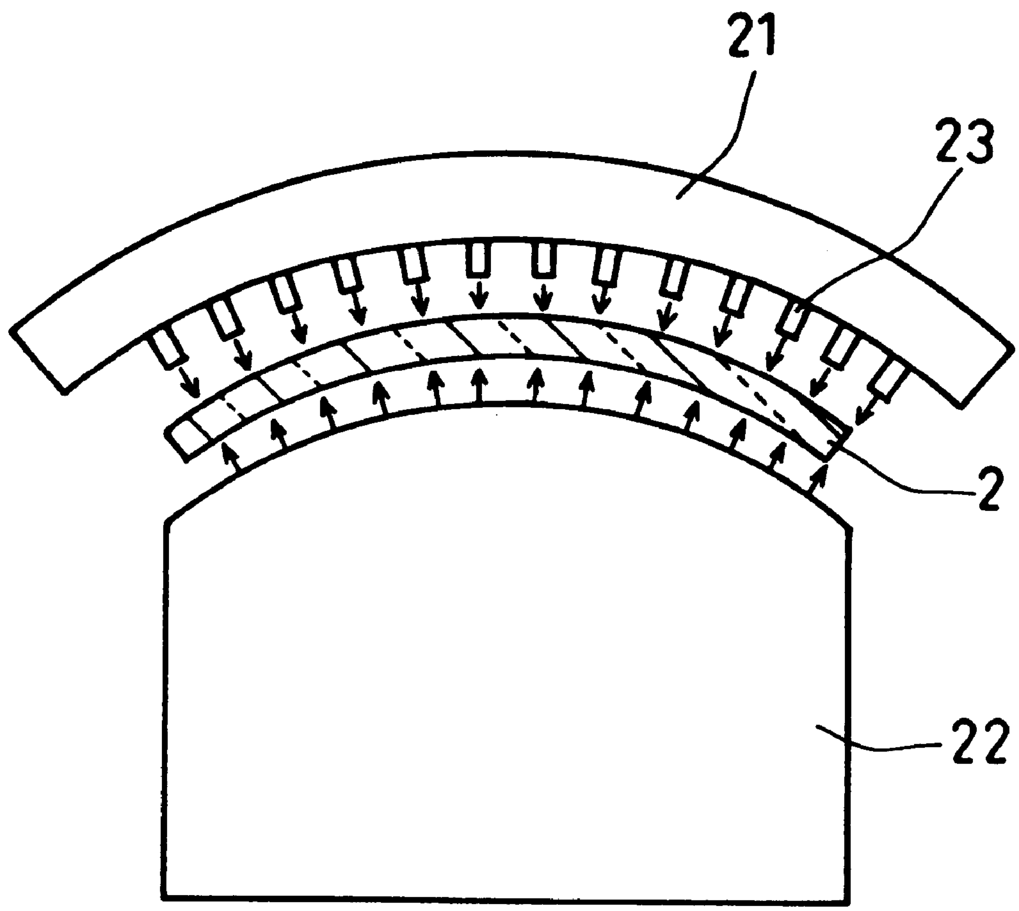
FIG. 3 is a cross-sectional view of the cooling apparatus illustrated in FIG. 2, showing a method for supporting the single glass sheet.
Figure 4:
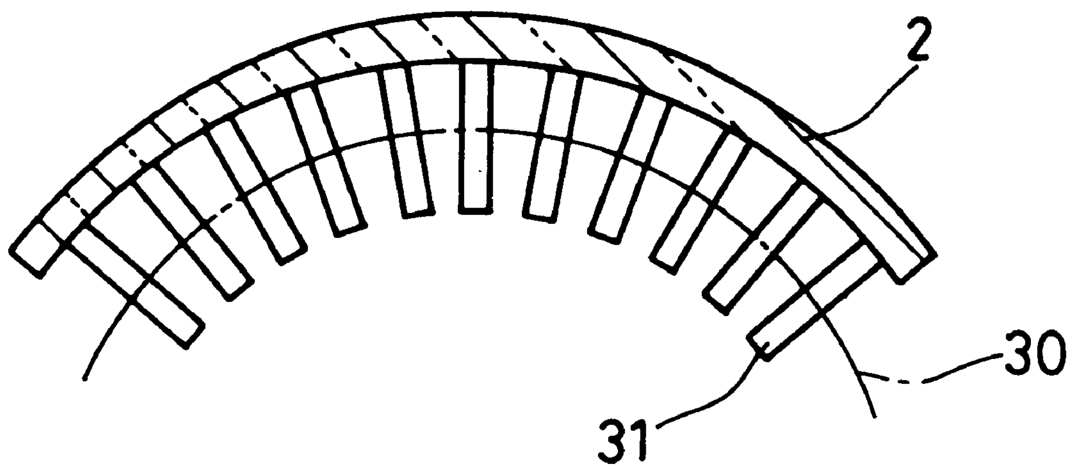
FIG. 4 is a cross-sectional view of the cooling apparatus showing another method for supporting the single glass sheet.

The invention shown in Tokuhyo-Hei No. 8-506564 shows that the peak of the tensile stress can be changed, as is apparent from the comparison between FIGS. 3 and 4 of the publication. However, no technical idea for eliminating the peak itself is shown.

On the other hand, the glass sheet used in the invention can be obtained by cooling without using a ring member for supporting the peripheral portion of the glass sheet. Therefore, unlike Tokuhyo-Hei No. 8-506564, the annular region of a plane residual tensile stress is not formed in the peripheral portion of the glass sheet, and the plane residual tensile stress has no peak.

In addition to the above-described plane residual stress distribution, the plane compressive residual stress at the edge of the peripheral portion of the single glass sheet is preferably 15 MN/$m^2$ or more.

As will be apparent from the following description, when the plane compressive residual stress is 15 MN/$m^2$ or more, the laminated glass is hardly broken starting from the edge by impacts as occurring in ordinary use.

Furthermore, in addition to the above-described plane residual stress distribution, the tensile stress at the central portion in the thickness direction of the single glass sheet is preferably 7 MN/$m^2$ or more.

As will be apparent from the following description, when the tensile stress is 7 MN/$m^2$ or more, the laminated glass is hardly broken starting from the surface of the glass sheet by impacts such as occurring in ordinary use.

Furthermore, in addition to the above-described plane residual stress distribution, the maximum of the plane tensile residual stress at the edge of the peripheral portion of the single glass sheet is preferably 2.5 MN/$m^2$ or less.

As will be apparent from the following description, when the maximum of the plane tensile residual stress is 2.5 MN/$m^2$ or less, the laminated glass is hardly broken by impacts such as occurring in ordinary use, starting from the portion having a higher plane tensile stress in the vicinity of the edge of the glass sheet.

A method for producing a single glass sheet, which is a component of a laminated glass of the present invention, will be more specifically described by way of embodiments with reference to the accompanying drawings.

First, a glass sheet 2 cut in a predetermined shape is heated to a predetermined temperature less than the glass softening point while being conveyed in a heating furnace 10 as shown in FIG. 2. The heating furnace 10 includes a conveying bed 11 that is horizontal at the inlet of the heating furnace and has a predetermined convex radius at the edge. The glass sheet is heated to the predetermined temperature and curved in accordance with the shape of the convex conveying bed by self-weight. When the glass sheet is being conveyed, it is floated by heated air 12 blowing from the conveying bed. The glass sheet can be conveyed by driving means (not shown) such as chains or belts provided in the side of the conveying bed, if necessary. The heating temperature for the glass sheet can be controlled by operating, for example, a heater or a burner (not shown) in the heating furnace while monitoring the temperature of the glass sheet.

Then, the glass sheet is cooled in a cooling apparatus 20 adjacent to the heating furnace. The cooling apparatus 20 includes upper cooling means 21 and lower cooling means 22. In the cooling apparatus, the glass sheet is floated by a cooling medium (e.g., air) blowing from the lower cooling means (see FIG. 3). Therefore, in the cooling process, it is unnecessary to support the peripheral portion of the glass sheet.

Thus, cooling the glass sheet without a ring member or the like make it possible to obtain a glass sheet having a plane residual stress that changes monotonically from a compressive stress to a tensile stress when moving away from the edge of the peripheral portion of the glass sheet toward the central portion of the glass sheet throughout the peripheral portion of the glass sheet.

The cooling of the glass sheet can be controlled and adjusted by changing the pressure or the temperature of the cooling medium supplied from the cooling means, the number or the arrangement of nozzles provided in the cooling means, and the distance between the upper face of the glass sheet and the nozzles of the upper cooling means. Air is generally used for the cooling medium.

Although the shape of the conveying bed is convex in this embodiment, it is not limited thereto, and may be concave as well.

In the above-described production method, an embodiment where the glass sheet is supported and conveyed by air pressure has been described. However, the present invention is not limited thereto. For example, as shown in FIG. 4, the glass sheet can be conveyed by rollers 31 positioned on a curved axis 30, and this embodiment also can be applied to the present invention. The glass sheet can be cooled by the same cooling means as those used in the above-described production method. In this case as well, since it is not necessary to support the glass sheet at the peripheral portion in the cooling process, the same single glass sheet as in the above-described production method can be obtained.

EXAMPLES

In the following examples, "single-dimensional bending process" refers to a process of bending a glass sheet approximately into a shape of a part of a cylinder.

Example 1

A soda-lime silicate glass sheet (thickness: 2.1 mm) produced by the float method was cut into a predetermined shape with a plane size of 520×920 mm. Thereafter, the edge of the glass sheet was beveled, washed and subjected to a bending and heat treatment process.

By the procedures of the above-mentioned production method, this glass sheet was bent by a single-dimensional bending. At this time, the maximum temperature of the heating furnace was set at 650° C., and the pressure of the cooling air from the lower cooling means was 300 mmAq, and 600 mmAq from the upper cooling means. The distance between the upper face of the glass sheet and the upper cooling nozzle was 25 mm.

The plane compressive residual stress at the edges of the peripheral portion of the single glass sheet was measured. The results were as follows:

Front side of the glass sheet with respect to the moving direction:

45.7 $MN/m^2$

Rear side of the glass sheet with respect to the moving direction:

27.0 $MN/m^2$

Side of the glass sheet with respect to the moving direction:

28.7 $MN/m^2$, 33.5 $MN/m^2$, 35.2 $MN/m^2$, 36.3 $MN/m^2$ (Measurement for this side is performed at four points)

Figure 5:
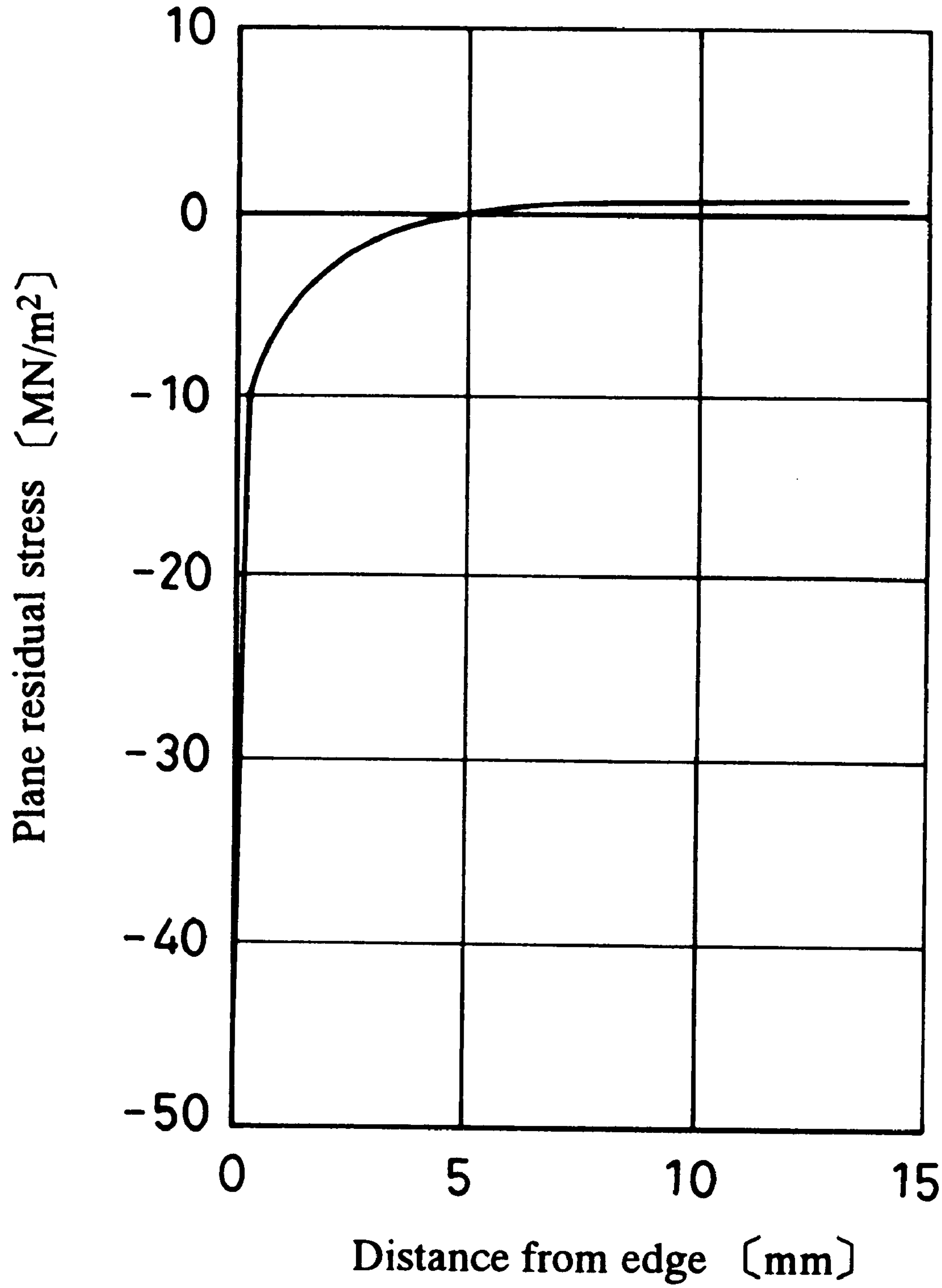
FIG. 5 is a graph showing a plane stress distribution of a single glass sheet for a laminated glass of the invention.

A compressive stress is represented by (−), and a tensile stress is represented by (+) in FIG. 5, which shows the stress distribution in this case.

The plane residual stress was measured by a strain meter SVP (manufactured by Toshiba). This meter measures the residual stress of a transparent object by utilizing a stress-birefringence due to polarization.

Furthermore, the glass sheet was broken into pieces, and the residual stress was measured with a polarization microscope in such a manner that the optical path is about 15 mm. The measurement was performed at three points inside the surface of the glass sheet.

As a result, it was confirmed that the residual stress on the surface of the glass sheet was a compressive stress and that the residual stress in a central portion in the section of the glass sheet was a tensile stress. The values of the tensile stress were 23.8 $MN/m^2$, 26.2 $MN/m^2$ and 27.1 $MN/m^2$.

Figure 1:
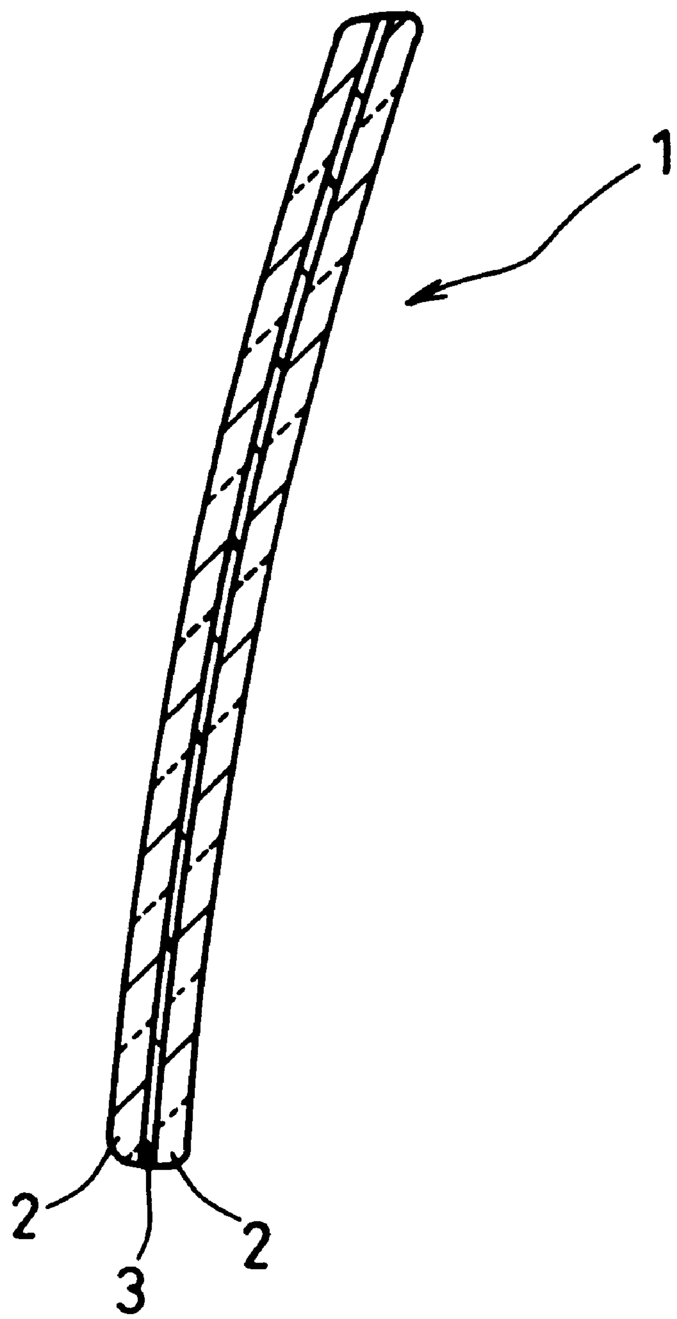
FIG. 1 is a cross-sectional view of a laminated glass of the invention.

Two single glass sheets 2 produced in the above-mentioned conditions were attached via a polyvinylbutyral (PVB) film 3 by a conventional method to obtain a laminated glass 1 (see FIG. 1).

The laminated glass was mounted to an automobile as a side door glass, and a test of opening and closing the door with the window half-open was repeated. The opening and closing of the door was performed in a strong manner to simulate the largest impacts in ordinary use. The result was that no damage was caused to the glass sheet.

Collisions during handling of the glass sheet caused no damage to the laminated glass.

Example 2

A single glass sheet having a thickness of 1.5 mm and a predetermined shape with a plane size of 450×750 mm was obtained by the same procedures as in Example 1.

The sheet was bent by a single-dimensional bending. At this time, the maximum temperature of the heating furnace was set to 645° C., and the pressure of the cooling air from the lower cooling means was 250 mmAq, and 600 mmAq from the upper cooling means. The distance between the upper face of the glass sheet and the upper cooling nozzle was 25 mm.

When the plane compressive residual stress at the edge of the peripheral portion of the single glass sheet was measured, the results were as follows:

Front side of the glass sheet with respect to the moving direction:

18.6 $MN/m^2$

Rear side of the glass sheet with respect to the moving direction:

16.3 $MN/m^2$

Side of the glass sheet with respect to the moving direction:

23.5 $MN/m^2$, 27.1 $MN/m^2$, 31.9 $MN/m^2$, 32.8 $MN/m^2$ (Measurement for this side is performed at four points)

Figure 6:
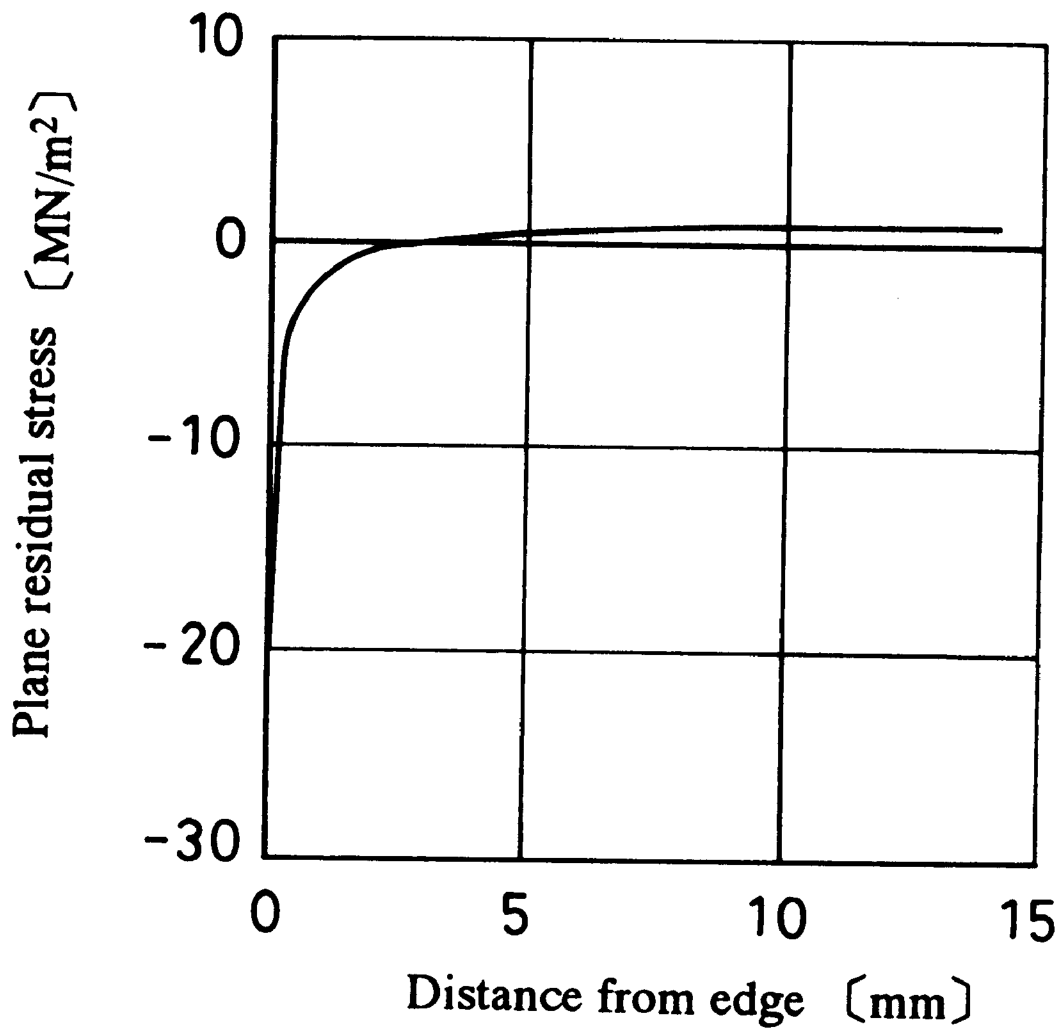
FIG. 6 is a graph showing another plane stress distribution of a single glass sheet for a laminated glass of the invention.
Figure 7:
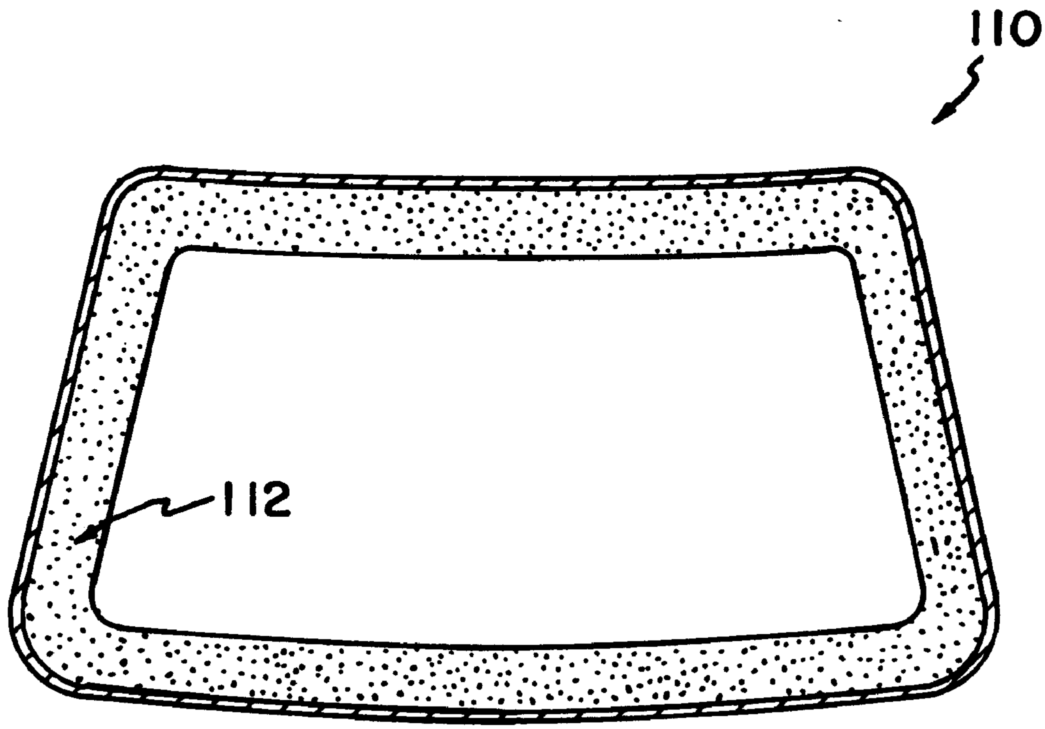
FIG. 7 is reproduced from FIG. 1 in Japanese Laid-Open Patent Publication (Tokuhyo-Hei) 8-506564 showing an annealing ring.
Figure 8:
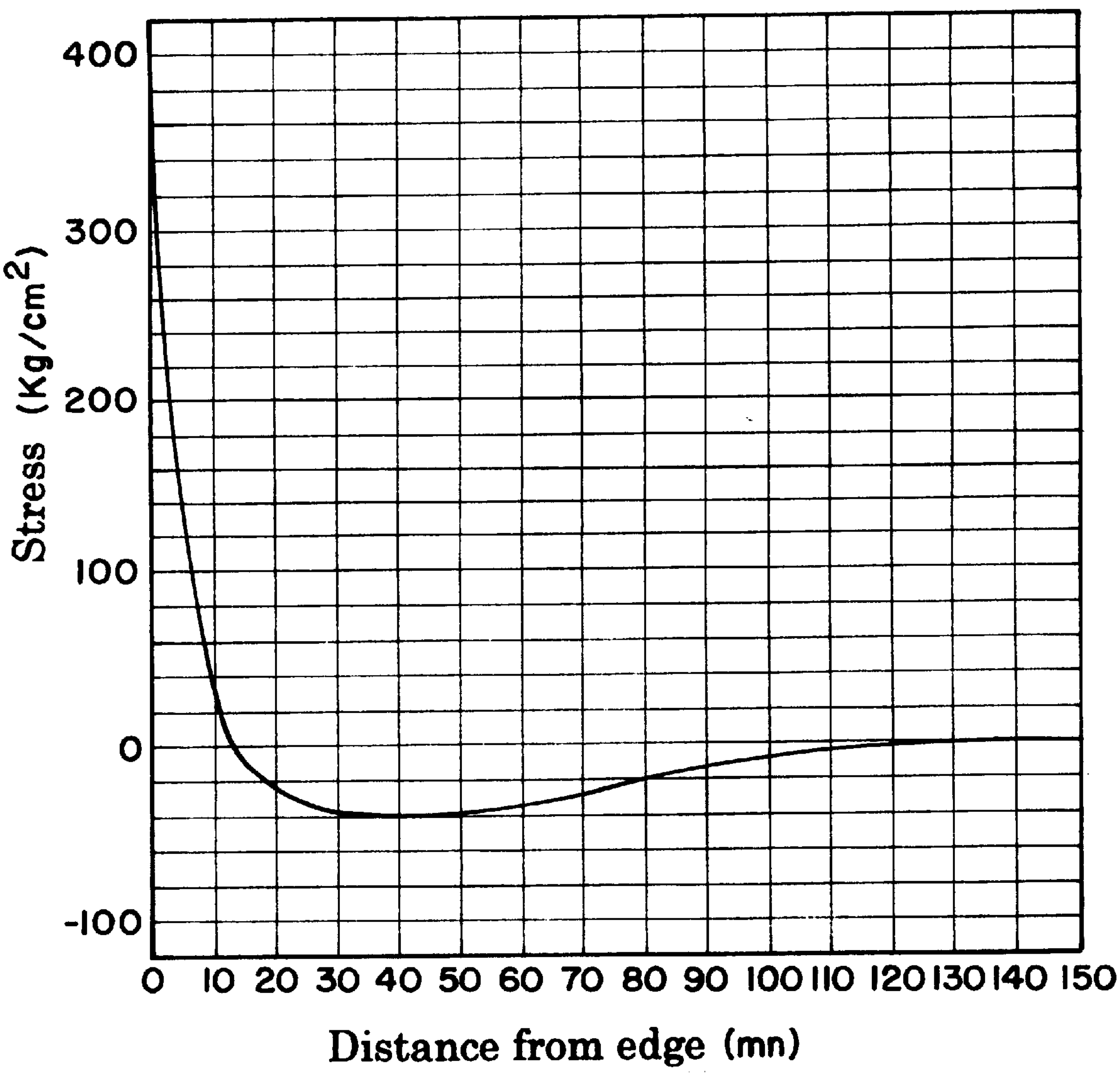
FIG. 8 is reproduced from FIG. 4 in Japanese Laid-Open Patent Publication (Tokuhyo-Hei) 8-506564. showing a known plain stress distribution
Figure 9:
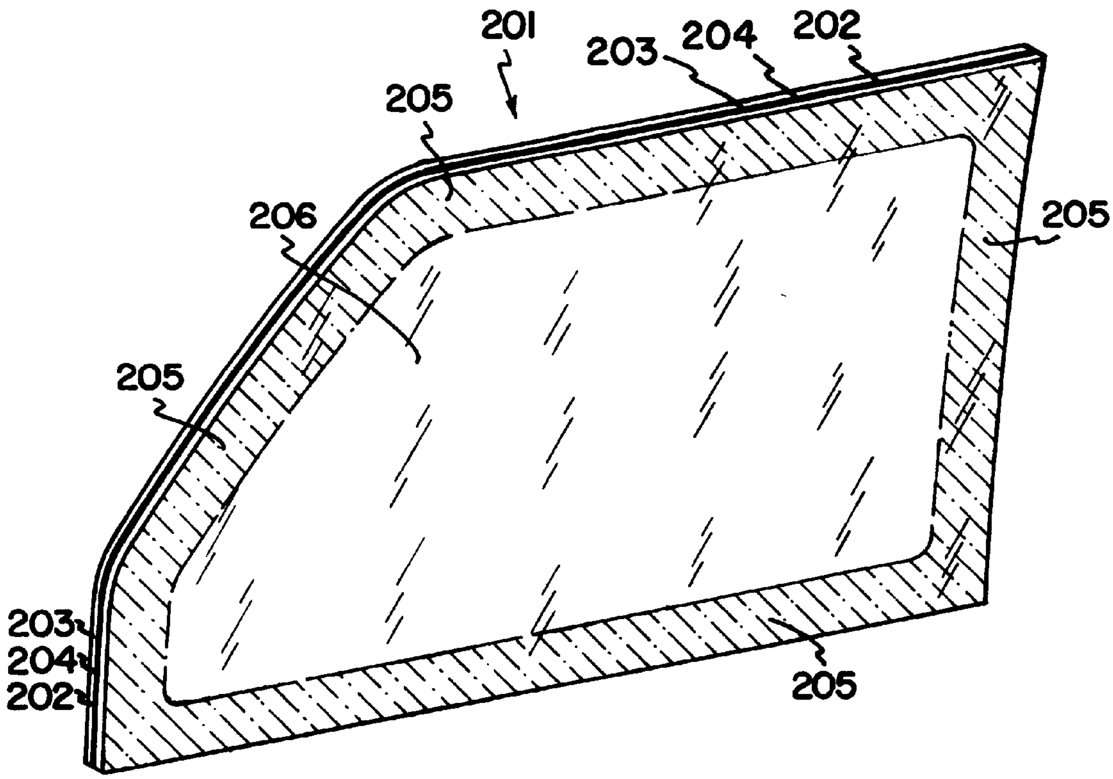
FIG. 9 is a perspective view of a window glass for an automobile, reproduced from FIG. 1 in Japanese Laid-Open Patent Publication (Tokkai-Hei) 4-231361.

A compressive stress is represented by (–), and a tensile stress is represented by (+) in FIG. 6, which shows the stress distribution in this case.

Furthermore, the residual stress of the glass sheet was measured in the same manner as above. The measurement was performed at three points inside the surface of the glass sheet. The residual stress on the surface of the glass sheet was a compressive stress, and the residual stress in a central portion of the glass sheet was a tensile stress. The values of the tensile stress were 7.6 $MN/m^2$, 9.5 $MN/m^2$, and 12.6 $MN/m^2$.

In the same manner as in Example 1, a laminated glass was produced. The test of opening and closing the door with the window haliopen was repeated as in Example 1. The result was that no damage was caused to the glass sheet. Collisions during handling of the single glass sheet or the laminated glass caused no damage.

In the above-described examples, the laminated glass of the present invention is used as a side door glass. Also, in the case where the present invention is used for a rear hatch door having an opening and closing mechanism, no damage was caused to the laminated glass. Also, in the case where the present invention is used as a windshield glass attached to the body frame, no damage was caused to the laminated glass under ordinary handling.

In Example 2, the single glass sheet has a thickness of 1.5 mm. In this case, the residual stress at the edges in the peripheral portions in the surface direction of the single glass sheet was successfully raised to 15 $MN/m^2$ or more. Therefore, when the thickness of the single glass sheet is not less than 1.5 mm, the residual stress can be not less than 15 $MN/m^2$ by the same method as described above.

The tensile stress in the central portion in the direction of the thickness of the single glass sheet at a thickness of 1.5 mm was successfully raised to 7 $MN/m^2$ or more. Therefore, when the thickness of the single glass sheet is not less than 1.5 mm, the tensile stress can be not less than 7 $MN/m^2$ by the same method as described above.

Furthermore, as seen from FIGS. 5 and 6, the maximum of the plane tensile residual stress at the edge of the peripheral portion of the single glass sheet in Examples 1 and 2 was about 1 $MN/m^2$. Therefore, the maximum of the plane tensile residual stress at the edge of the peripheral portion of the single glass sheet constituting the present invention was not more than 2.5 $MN/m^2$.

Each single glass sheet included in the laminated glass of the present invention is preferably a heat-strengthened glass sheet as described above.

Comparative Example 1

A single glass sheet having a thickness of 1.5 mm and a shape suitable for a predetermined door with a plane size of 450×750 mm was obtained by the same procedures as in Example 1.

The sheet was bent by a single-dimensional bending. At this time, the maximum temperature of the heating furnace was set to 645° C.

Thereafter, the glass sheet was not quenched but annealed.

When the plane residual stress at the edges of the peripheral portion of the single glass sheet was measured, the results were as follows:

Front side of the glass sheet with respect to the moving direction:

3.7 $MN/m^2$

Rear side of the glass sheet with respect to the moving direction:

1.4 $MN/m^2$

Side of the glass sheet with respect to the moving direction:

2.2 $MN/m^2$, 2.6 $MN/m^2$, 3.5 $MN/m^2$, 3.8 $MN/m^2$ (Measurement for this side is performed at four points)

Furthermore, the residual stress of the glass sheet was measured in the same manner as above. The measurement was performed at three points inside the surface of the glass sheet. The residual stress in a central portion of the glass sheet was a tensile stress. The values of the tensile stress were 1.1 $MN/m^2$, 1.4 $MN/m^2$ and 2.1 $MN/m^2$.

According to Comparative Example 1, the residual stress at the edge of the peripheral portion in the surface direction of the single glass sheet was 3.8 $MN/m^2$ at the maximum, and failed to reach 15 $MN/m^2$ or more.

Furthermore, the residual stress was 2.1 $MN/m^2$ at the maximum, and failed to reach 7 $MN/m^2$ or more.

In the same manner as in Example 1, a laminated glass was produced. The test of opening and closing the door with the window half-open was repeated as in Example 1. The result was that the laminated glass was broken. Collisions during handling of the single glass sheet or the laminated glass tended to cause breakage.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A laminated glass comprising at least two single glass sheets and an intermediate layer between the glass sheets so as to adhere the glass sheets, each single glass sheet having a thickness of 1.5 to 3.2 mm, each single glass sheet being subjected to a bending process, and at least one of the single glass sheets being a heat-strengthened glass sheet having a plane residual stress distribution at an edge surface of a peripheral portion of the single glass sheet, wherein the plane residual stress at the edge surface of the peripheral portion of the single glass sheet is a compressive stress, wherein the plane residual stress at the edge surface of the peripheral portion of the single glass sheet changes monotonically from the compressive stress at the edge surface of the peripheral portion to a tensile stress in a central portion of the surface of the glass sheet.

2. The laminated glass according to claim 1, wherein the plane compressive residual stress at the edge surface of the peripheral portion of the heat-strengthened glass sheet is at least 15 $MN/m^2$.

3. The laminated glass according to claim 1, wherein the heat-strengthened glass sheet has a residual tensile stress in a central portion in a thickness direction of the glass sheet, and the residual tensile stress is between 7 $MN/m^2$ and 55 $MN/m^2$ throughout the entire area of the glass sheet.

4. The laminated glass according to claim 1, wherein the maximum of the plane tensile residual stress at the edge surface of the peripheral portion of the heat-strengthened glass sheet is 2.5 $MN/m^2$ or less.

5. The laminated glass according to claim 1, wherein the bending process of the heat-strengthened glass sheet is substantially a single-dimensional bending.

6. The laminated glass according to claim 1, wherein the heat-strengthened glass sheet is produced by cooling the entire surface of the single glass sheet substantially uniformly.

7. A laminated glass comprising at least two single glass sheets and an intermediate layer between the glass sheets so as to adhere the glass sheets, each single glass sheet having a thickness of 1.5 to 3.2 mm, each single glass sheet being subjected to a bending process, and at least one of the single glass sheets being a heat-strengthened glass sheet having a plane residual stress distribution at an edge surface of a peripheral portion of the single glass sheet, wherein the plane residual stress at the edge surface of the peripheral portion of the single glass sheet is a compressive stress, wherein no annular plain tensile stress region throughout an inner surface portion along the edge surface of the peripheral portion of the single glass sheet is present.

8. The laminated glass according to claim 7, wherein the plane compressive residual stress at the edge surface of the peripheral portion of the heat-strengthened glass sheet is at least 15 $MN/m^2$.

9. The laminated glass according to claim 7, wherein the heat-strengthened glass sheet has a residual tensile stress in a central surface portion in a thickness direction of the glass sheet, and the residual tensile stress is between 7 $MN/m^2$ and 55 $MN/m^2$.

10. The laminated glass according to claim 7, wherein the maximum of the plane tensile residual stress at the edge surface of the peripheral portion of the heat-strengthened glass sheet is 2.5 $MN/m^2$ or less.

11. The laminated glass according to claim 7, wherein the bending process of the heat-strengthened glass sheet is substantially a single-dimensional bending.

12. The laminated glass according to claim 7, wherein the heat-strengthened glass sheet is produced by cooling the surface of the single glass sheet substantially uniformly.

* * * * *